(12) United States Patent
Tsugita et al.

(10) Patent No.: US 10,678,539 B2
(45) Date of Patent: Jun. 9, 2020

(54) INFORMATION PROCESSING DEVICE, INFORMATION PROCESSING METHOD FOR DETERMINING PROGRAM, AND STORAGE MEDIUM

(71) Applicant: FUJITSU LIMITED, Kawasaki-shi, Kanagawa (JP)

(72) Inventors: Yusuke Tsugita, Yokohama (JP); Hiroyasu Kageyama, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/168,876

(22) Filed: Oct. 24, 2018

(65) Prior Publication Data

US 2019/0129713 A1 May 2, 2019

(30) Foreign Application Priority Data

Oct. 30, 2017 (JP) ................. 2017-209335

(51) Int. Cl.
*G06F 9/445* (2018.01)
*G06F 8/75* (2018.01)
*G06F 8/41* (2018.01)
*G06F 8/61* (2018.01)
*G06F 21/10* (2013.01)

(52) U.S. Cl.
CPC .............. *G06F 8/75* (2013.01); *G06F 8/433* (2013.01); *G06F 8/61* (2013.01); *G06F 21/105* (2013.01)

(58) Field of Classification Search
CPC ....................................................... G06F 8/75
See application file for complete search history.

(56) References Cited

U.S. PATENT DOCUMENTS

| 7,818,351 B2* | 10/2010 | Nomura | G06F 16/24558 |
| | | | 707/803 |
| 2004/0044996 A1* | 3/2004 | Atallah | G06F 8/71 |
| | | | 717/169 |
| 2008/0228751 A1* | 9/2008 | Kenedy | G16H 50/30 |

FOREIGN PATENT DOCUMENTS

| JP | 2010-224773 | 10/2010 |
| JP | 2014-056340 | 3/2014 |
| JP | 2016-045627 | 4/2016 |

* cited by examiner

*Primary Examiner* — Hang Pan
(74) *Attorney, Agent, or Firm* — Fujitsu Patent Center (57) ABSTRACT

An information processing device includes a memory; and a processor coupled to the memory and configured to: acquire information including storage destinations for modules of a plurality of software installed in the device, and attribute values for attribute items of the plurality of software from each of a plurality of programs; uniquely identify the plurality of software indicated by the acquired information based on the storage destinations for the modules of the plurality of software indicated by the acquired information; calculate an appearance frequency of the plurality of software in the acquired information for a combination of each of the plurality of programs and each of the attribute values; and determine a correspondence relationship between each of the uniquely identified plurality of software and one of the plurality of programs from which information on the plurality of software is acquired, based on the calculated frequency of appearance.

13 Claims, 12 Drawing Sheets

| MANAGEMENT PROGRAM | SOFTWARE NAME | VERSION | INSTALLATION DESTINATION | FILE PATH | VENDOR | LICENSE | OS TYPE | SOFTWARE ID |
|---|---|---|---|---|---|---|---|---|
| Program A | Software A | V1.0 | - | nnn/bin/xyz | Vendor A | License A | OS A | 000001 |
| Program A | Software B | V2.1 | pp/qqq/s/rrr | ttt/uuu/bin/rrr | Vendor B | License B | OS B | 000002 |
| Program A | Software D | V3.0 | - | pqr/efg/bin/mn | Vendor D | License A | OS C | 000007 |
| Program B | Software C | V11.0 | mmm/ss/zz | - | Vendor A | License C | OS C | 000003 |
| ... | | | | | | | | |
| Program C | Software A | V1.0.0 | dd/nn/pp/xyz | - | Vendor A | License B | OS A | 000001 |
| Program C | Software C | V3.3 | - | a/c/xx/bin/zz | Vendor C | License A | OS C | 000003 |

FIG. 5

| SOFTWARE ID | FILE NAME | HASH VALUE |
|---|---|---|
| 000001 | aaaa | d5a4508fdc93cac73a5eb91ab96c020e |
| 000001 | bbbb | 65a4508fdc93cac73a5eb91ab96c4735 |
| 000001 | cccc | 95a4508fdc93cac73a5eb91ab96c6854 |
| ⋮ | ⋮ | ⋮ |
| 000002 | eeee | b5a4508fdc93cac73a5eb91ab96c6722 |
| ⋮ | ⋮ | ⋮ |
| 000003 | jjjj | 98g8693fcsd74da3a87d65ss71spc7445 |

FIG. 6

<ATTRIBUTE ITEM: VENDOR>

| MANAGEMENT PROGRAM | ATTRIBUTE VALUE | NUMBER OF PIECES OF SOFTWARE | RATIO |
|---|---|---|---|
| Program A | Vendor A | 39 | 39/41 |
| Program A | Vendor B | 1 | 1/41 |
| Program A | Vendor C | 1 | 1/41 |
| Program B | Vendor A | 5 | 5/17 |
| Program B | Vendor B | 6 | 6/17 |
| Program B | Vendor C | 6 | 6/17 |

FIG. 7

<ATTRIBUTE ITEM: LICENSE>

| MANAGEMENT PROGRAM | ATTRIBUTE VALUE | NUMBER OF PIECES OF SOFTWARE | RATIO |
|---|---|---|---|
| Program A | License A | 12 | 12/39 |
| Program A | License B | 11 | 11/39 |
| Program A | License C | 16 | 16/39 |
| Program B | License A | 8 | 8/58 |
| Program B | License B | 32 | 32/58 |
| Program B | License C | 18 | 18/58 |

FIG. 8

<ATTRIBUTE ITEM: OS TYPE>

| MANAGEMENT PROGRAM | ATTRIBUTE VALUE | NUMBER OF PIECES OF SOFTWARE | RATIO |
|---|---|---|---|
| Program A | OS A | 1 | 1/5 |
| Program A | OS B | 1 | 1/5 |
| Program A | OS C | 3 | 3/5 |
| Program B | OS A | 5 | 5/10 |
| Program B | OS B | 2 | 2/10 |
| Program B | OS C | 3 | 3/10 |

| MANAGEMENT PROGRAM | ATTRIBUTE VALUE | NUMBER OF PIECES OF SOFTWARE | RATIO |
|---|---|---|---|
| Program A | Vendor A | 39 | 39/41 |
| Program A | OS C | 3 | 3/5 |
| Program B | License B | 32 | 32/58 |
| Program B | OS A | 5 | 5/10 |
| Program A | License C | 16 | 16/39 |
| Program B | Vendor B | 6 | 6/17 |
| Program B | Vendor C | 6 | 6/17 |
| Program B | License C | 18 | 18/58 |
| Program A | License A | 12 | 12/39 |
| Program B | OS C | 3 | 3/10 |
| Program B | Vendor A | 5 | 5/17 |
| Program A | License B | 11 | 11/39 |
| Program A | OS A | 1 | 1/5 |
| Program A | OS B | 1 | 1/5 |
| Program B | OS B | 2 | 2/10 |
| Program B | License A | 8 | 8/58 |
| Program A | Vendor B | 1 | 1/41 |
| Program A | Vendor C | 1 | 1/41 |

FIG. 11

| SOFTWARE ID | SOFTWARE NAME | VERSION |
|---|---|---|
| 000001 | SOFTWARE A | V1.0 |
| 000002 | SOFTWARE B | V2.1 |
| 000003 | SOFTWARE C | V3.3 |

FIG. 12

| SERVER | SOFTWARE ID |
|---|---|
| Server A | 000001 |
| Server A | 000002 |
| Server B | 000003 |

INFORMATION PROCESSING DEVICE, INFORMATION PROCESSING METHOD FOR DETERMINING PROGRAM, AND STORAGE MEDIUM

CROSS-REFERENCE TO RELATED APPLICATION

This application is based upon and claims the benefit of priority of the prior Japanese Patent Application No. 2017-209335, filed on Oct. 30, 2017, the entire contents of which are incorporated herein by reference.

FIELD

The embodiment discussed herein is related to an information processing device, an information processing method, and a storage medium.

BACKGROUND

The information on software installed in a server may be collected by what is called the management program (also referred to as the management tool). The management program includes, for instance, a management program for an operating system (OS), a management program (such as UpdateAdvisor) provided by a software vendor, and a management program (software management product) introduced by a user. Target software, from which information is to be collected, may vary with management program. For this reason, a situation is assumed in which in order to collect information on each software installed in a server, information is collected from multiple management programs. Thus, a technique for managing information collected from multiple management programs in an integrated manner has been proposed. For instance, Japanese Laid-open Patent Publication No. 2014-56340, Japanese Laid-open Patent Publication No. 2016-45627, and Japanese Laid-open Patent Publication No. 2010-224773 are disclosed as related art.

In the technique mentioned above, information on the same software may be collected by multiple management programs. However, even information on the same software may be collected in a different format of software name and version depending on management program. Thus, pieces of information collected by management programs are not considered to be the same software, and the pieces of information collected from multiple management programs may not be managed in a unified manner. In consideration of the situation, when information on each software installed in a device is collected by multiple programs, it is desirable that a program which collects information may be determined for each software.

SUMMARY

According to an aspect of the embodiments, an information processing device includes a memory; and a processor coupled to the memory and configured to: acquire information including storage destinations for modules of a plurality of software installed in the device, and attribute values for attribute items of the plurality of software from each of a plurality of programs; uniquely identify the plurality of software indicated by the acquired information based on the storage destinations for the modules of the plurality of software indicated by the acquired information; calculate an appearance frequency of the plurality of software in the acquired information for a combination of each of the plurality of programs and each of the attribute values; and determine a correspondence relationship between each of the uniquely identified plurality of software and one of the plurality of programs from which information on the plurality of software is acquired, based on the calculated frequency of appearance.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

Hereinafter an embodiment according to the technique in the present disclosure will be described with reference to the drawings. The following detailed description are exemplary, and not intended to limit the configuration of the embodiment.

Figure 1:
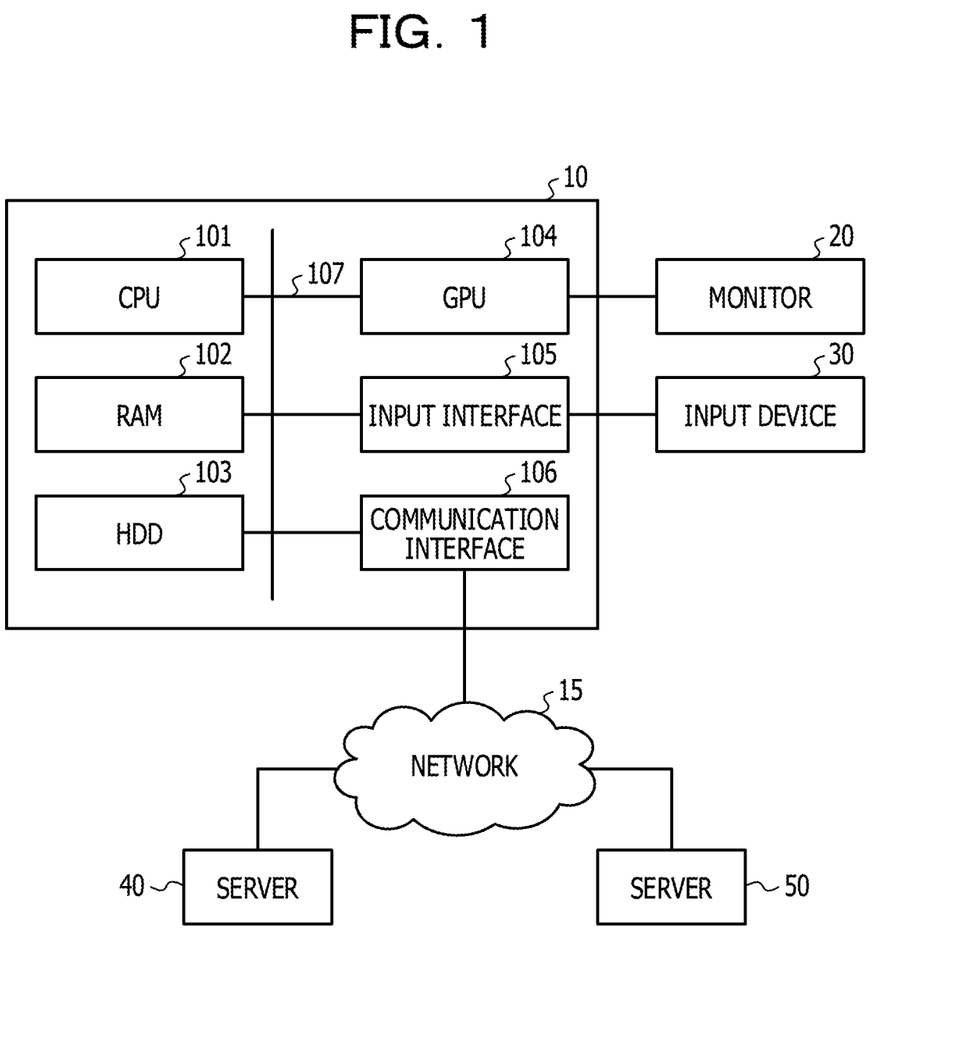
FIG. 1 is a diagram illustrating an example of a configuration of an information processing device in an embodiment.

An information processing device 10 in an embodiment will be described. The information processing device 10 includes a central processing unit (CPU) 101, a random access memory (RAM) 102, a hard disk drive (HDD) 103, a graphics processing unit (GPU) 104, an input interface 105, and a communication interface 106. The GPU 104, the input interface 105, and the communication interface 106 are connected to a monitor 20, an input device 30, and a network 15, respectively. The CPU 101, the RAM 102, the HDD 103, the GPU 104, the input interface 105, and the communication interface 106 are coupled to each other via a bus 107.

The information processing device 10 is coupled to servers 40, 50 via the network 15. In the embodiment, one or more management programs, which collect the information on software installed in the server 40, are executed in the server 40. The information collected by the management programs is transmitted to the information processing device 10 by the below-described processing. Similarly, management programs are executed in the server 50, and the information on software installed in the server 50 is collected. A server connected to the information processing device 10 is not limited to the servers 40, 50. The information processing device 10 manages information related to the components in an information processing system including the servers 40, 50 in an integrated manner using a configuration management database (CMDB). For instance, the CMDB is stored in the HDD 103. In the embodiment, the information processing device 10 recognizes the software installed in the servers 40, 50 using the CMDB.

Figure 2:
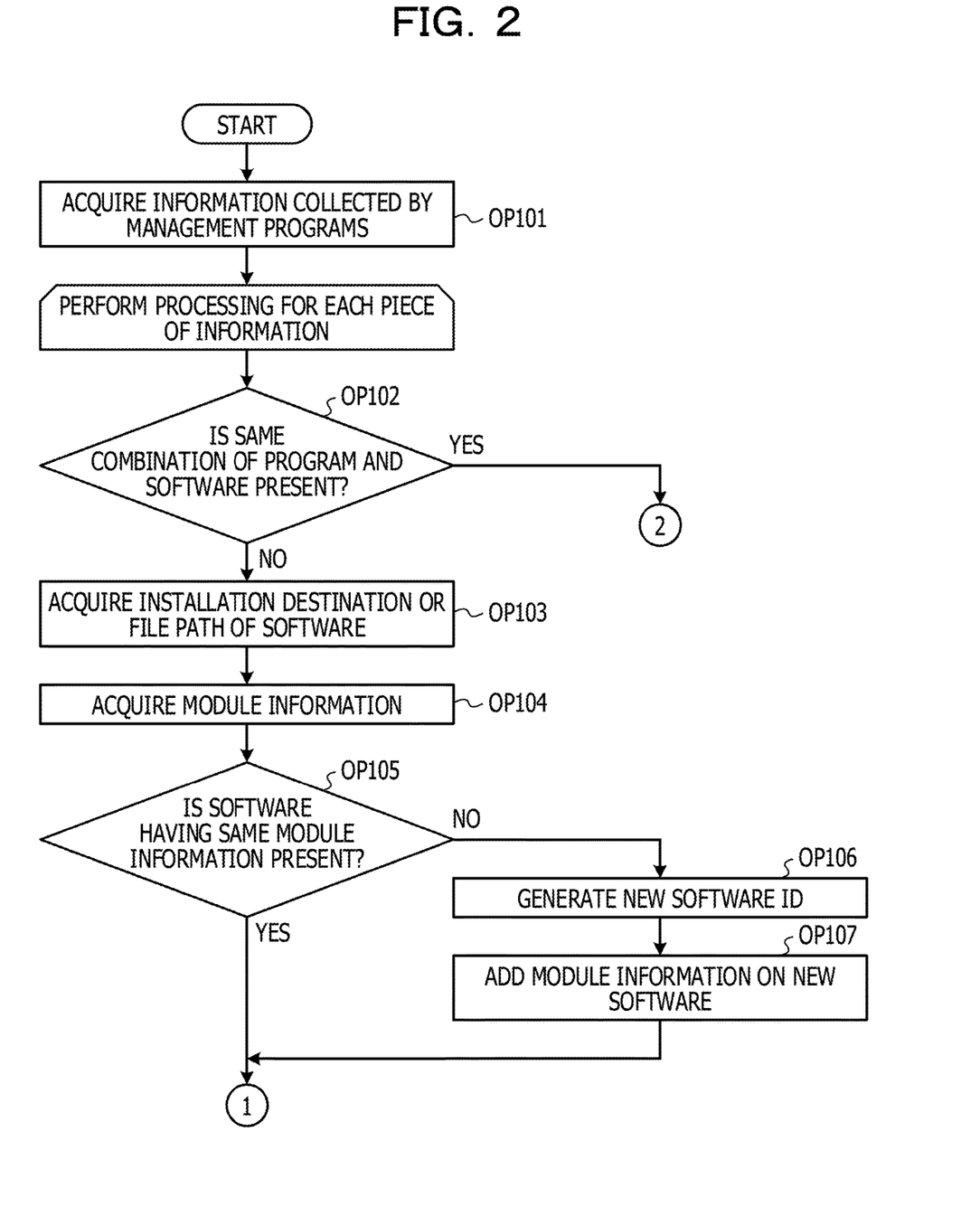
FIG. 2 is a flowchart illustrating an example of processing performed by the information processing device in the embodiment.
Figure 3:
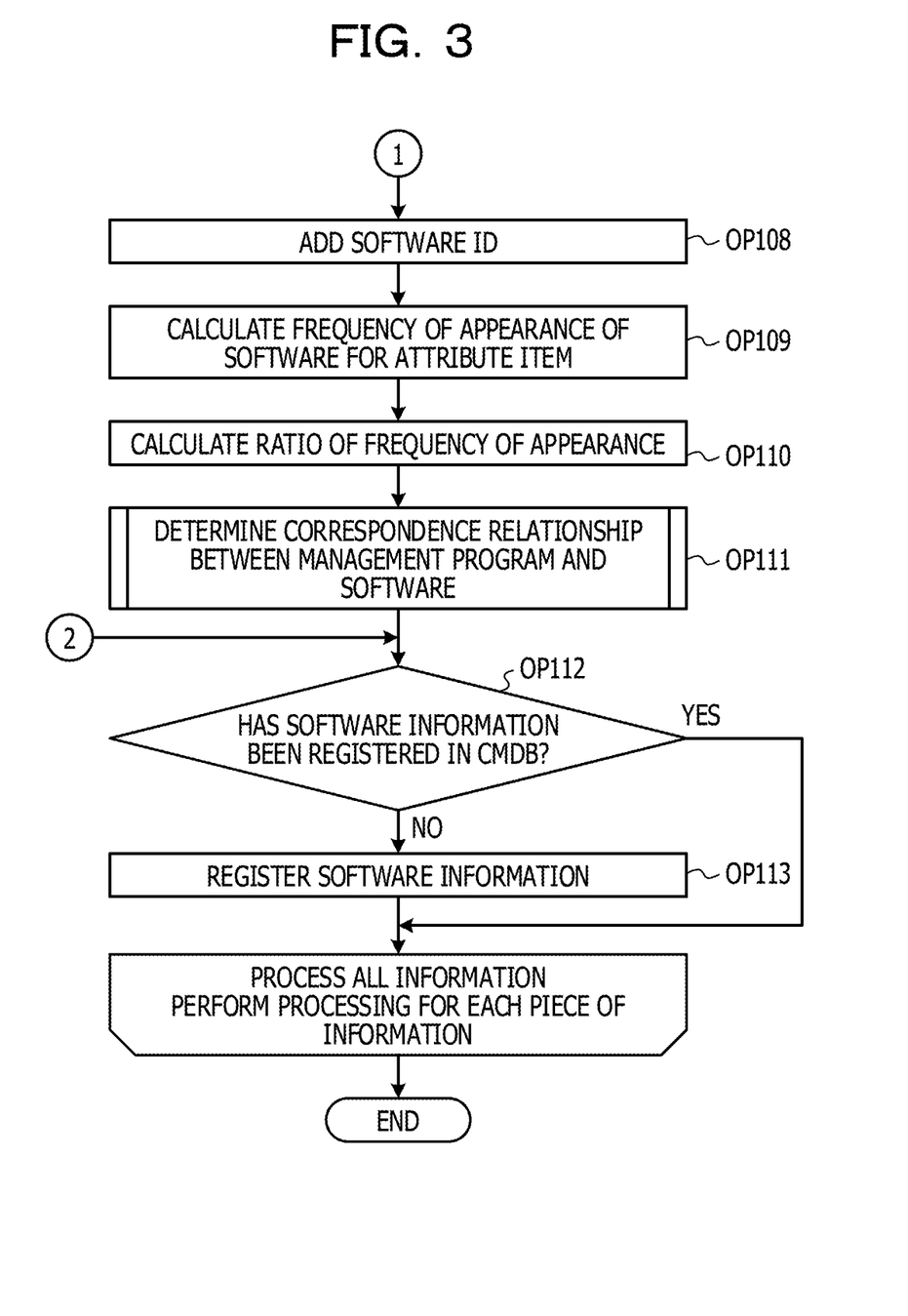
FIG. 3 is a flowchart illustrating an example of processing performed by the information processing device in the embodiment subsequent to the processing illustrated in FIG. 2.

In the embodiment, the CPU 101 performs various types of processing described below by loading and executing various programs onto the RAM 102, the various programs including the later-described management programs stored in the HDD 103. FIGS. 2 and 3 illustrate an example of a flowchart of the processing performed by control of the CPU 101 in the information processing device 10 in the embodiment. When the power source of the information processing device 10 is turned on, the processing of the flowchart illustrated in FIG. 2 is started.

In OP 101, the CPU 101 functions as an acquisition unit, and acquires the information on software collected by the management programs from the servers 40, 50. In OP 101, the CPU 101 acquires information collected from multiple programs that collect information including storage destinations of modules of multiple pieces of software installed in the device, and the attribute values for attribute items of the multiple pieces of software. When acquiring the information on software collected by the management programs from the servers 40, 50, the CPU 101 proceeds the processing to OP 102. In the embodiment, the CPU 101 repeatedly performs the processing in OP 102 to OP 113 for each piece of information on software acquired in OP 101.

In OP 102, for the acquired information on software, the CPU 101 determines whether or not information indicating the same combination as that of the management program which has collected the information and the relevant software is already acquired. For example, the CPU 101 refers to the table which stores the information acquired in OP 101, and determines whether or not the combination of a management program, a software name, and a version is the same between the acquired information and the information stored in the table.

If pieces of information with the same combination of a management program and software between the acquired information and the information stored in the table are redundantly stored in the table, at the time the below-described calculation of the frequency of appearance of each software, the frequency of appearance may not be calculated correctly. Thus, the processing in OP 102 makes it possible to avoid redundantly storing the information based on which a frequency of appearance of software is calculated.

When information indicating the same combination as that of the management program and the relevant software is already acquired (YES in OP 102), the CPU 101 proceeds the processing to OP 112. On the other hand, when information indicating the same combination as that of the management program and the relevant software has not been acquired (NO in OP 102), the CPU 101 proceeds the processing to OP 103.

Figure 4:
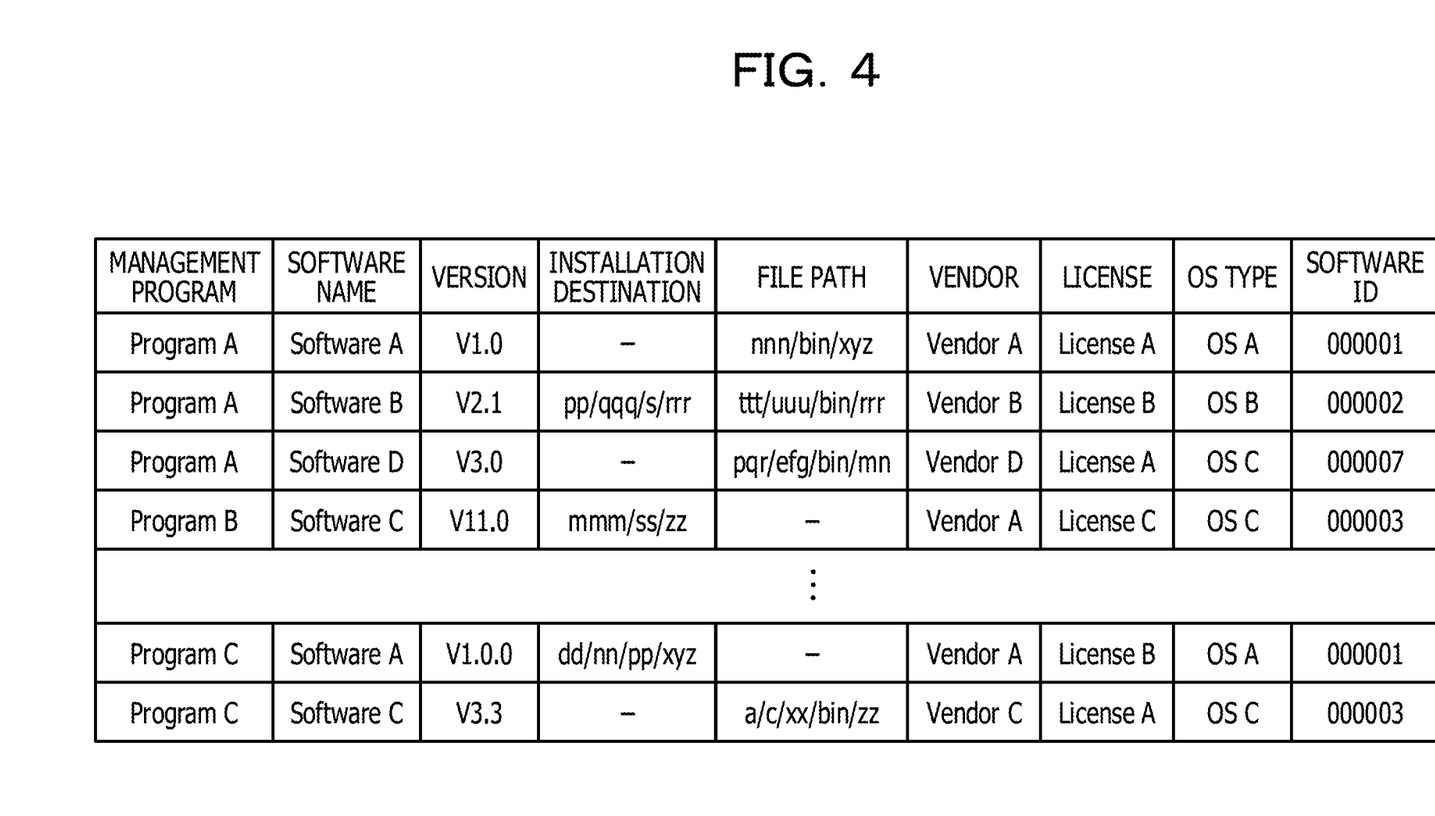
FIG. 4 is a chart illustrating an example of a table that stores information collected by a management program in the embodiment.

FIG. 4 illustrates an example of a table that stores the information on software acquired in OP 101 in the embodiment. The table may be stored in a storage unit other than the HDD 103. The information collected by management programs include the software name and version of each software, the installation destination and file path of each module of the software, the vendor of the software, the license of the software, and an OS that executes the software. The software name and version of each software, the installation destination and file path of each module of the software, the vendor of the software, the license of the software, and an OS that executes the software included in the information collected by the management programs is an example of attribute values of attribute items of the software. The table illustrated in FIG. 4 also stores software ID which is an identifier to uniquely identify each software, the software ID being determined by the below-described processing.

In OP 103, the CPU 101 acquires information on installation destination or file path of each module from the information on the software. In the case of information on the software illustrated in FIG. 4, the CPU 101 acquires the information in the "INSTALLATION DESTINATION" column or the "FILE PATH" column of the table. Subsequently, the CPU 101 proceeds the processing to OP 104.

In OP 104, from the server (the server 40 or the server 50) which executes the management program which acquired the information on the software, the CPU 101 acquires information on a module at a position indicated by the installation destination or the file path acquired in OP 103. As a specific example, the CPU 101 acquires the file name and the hash value of a module at a position indicated by the installation destination or the file path. When multiple modules are present, the CPU 101 acquires the file name and the hash value (hereinafter may be referred to as "module information") of each of the modules. Subsequently, the CPU 101 proceeds the processing to OP 105.

Figure 5:
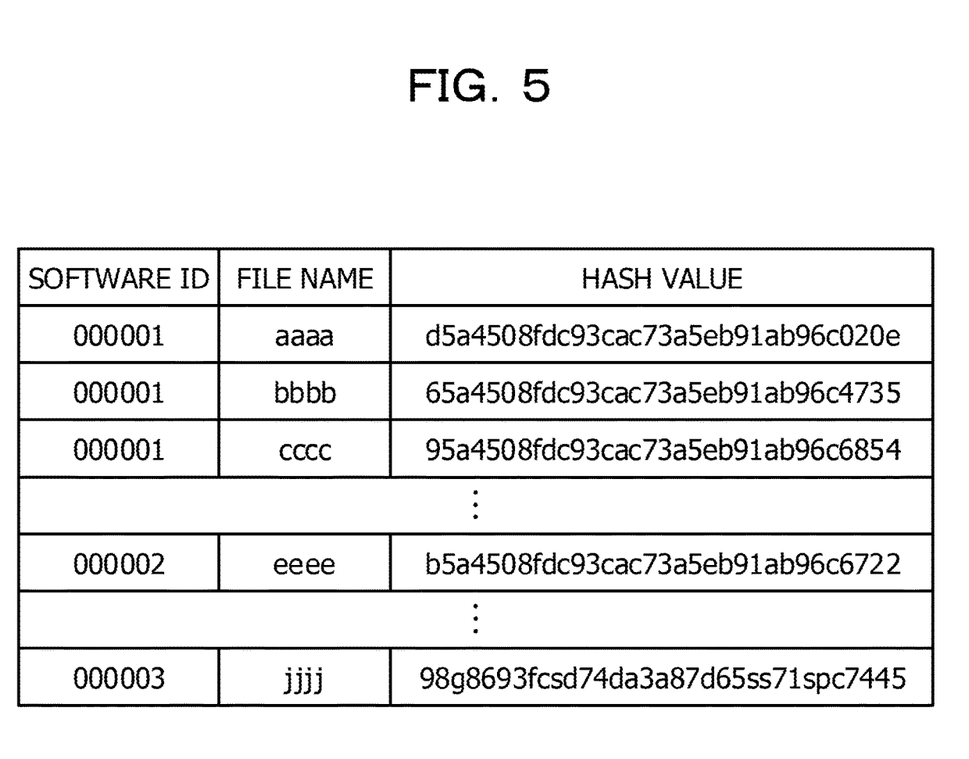
FIG. 5 is a chart illustrating an example of a table that stores module information of software in the embodiment.

In OP 105, the CPU 101 determines based on the module information acquired in OP 104 whether or not information on software having the same module information is already acquired. FIG. 5 illustrates an example of a table that stores module information of software in the information processing device 10. The table illustrated in FIG. 5 stores combinations of a software ID, a file name and a hash value of each module included in software in association with each other, the combinations being generated by the below-described processing. Software may have multiple modules. Therefore, one software ID may be associated with multiple combinations of a file name and a hash value.

In OP 105, the CPU 101 functions as an identification unit, and for each software ID stored in the table illustrated in FIG. 5, determines whether or not the combination of the file name and the hash value of the software ID match the combination of the file name and the hash value of the module acquired in OP 104. The CPU 101 uniquely identifies multiple pieces of software indicated by acquired information based on the storage location of each module of the software indicated by acquired information in OP 104.

When multiple combinations of a file name and a hash value of a module are acquired in OP 104, the CPU 101 determines whether or not all combinations match the combinations associated with the software ID. Consequently, when the combinations of a file name and a hash value acquired in OP 104 match all combinations of a file name and a hash value associated with the software ID, it is determined that the software is the same.

When the table illustrated in FIG. 5 includes software having module information matching the module information of the acquired module (YES in OP 105), the CPU 101 proceeds the processing to OP 108. On the other hand, when the table illustrated in FIG. 5 does not include software having module information matching the module information of the acquired module (NO in OP 105), the CPU 101 proceeds the processing to OP 106.

In OP 106, the CPU 101 generates a new software ID which is distinct from any software ID stored in the table illustrated in FIG. 5. Subsequently, the CPU 101 proceeds the processing to OP 107. In OP 107, the CPU 101 adds the software ID generated in OP 106, and the combination of a file name and a hash value of the module acquired in OP 104 to the table illustrated in FIG. 5 in association with each other. Subsequently, the CPU 101 proceeds the processing to OP 108.

In OP 108, the CPU 101 stores information on the software on which the processing in OP 102 to OP 113 is currently performed, and the software ID in corresponding columns of the table illustrated in FIG. 4 in association with each other. When it is determined in OP 105 that matching software is present, the software ID of the matching software is used. When it is determined in OP 105 that no matching software is present, the software ID generated in OP 106 is used. Subsequently, the CPU 101 proceeds the processing to OP 109.

In the embodiment, the columns of the table illustrated in FIG. 4 correspond to the attribute items of information on software collected by the management programs. Thus, in OP 109, for one of the attribute items corresponding to the columns of the table illustrated in FIG. 4, the CPU 101 calculates the frequency of appearance of each software in the information on software acquired by the management programs for each of the management programs.

Figure 6:
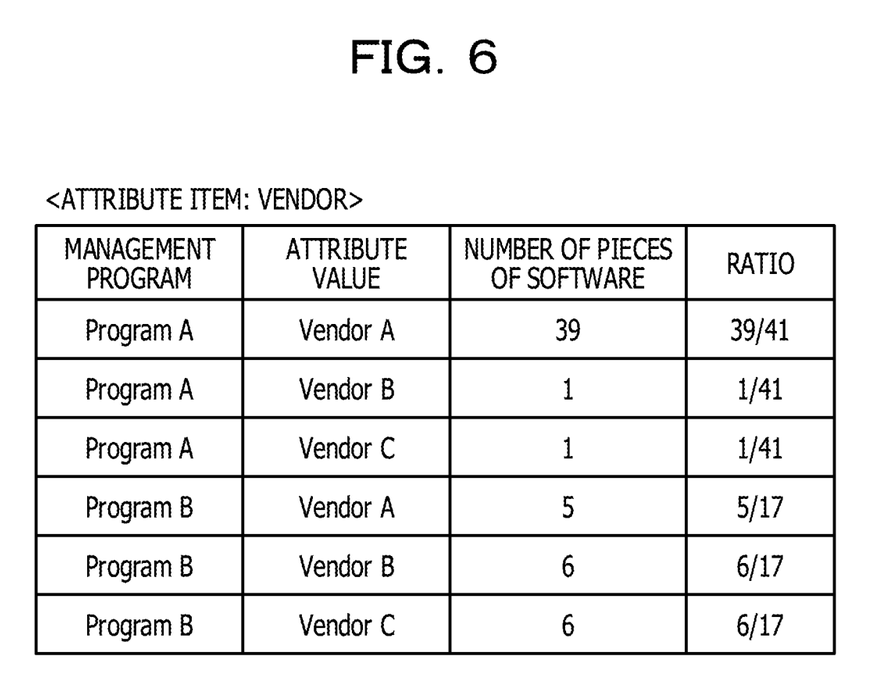
FIG. 6 is a chart illustrating an example of a result of calculation of a frequency of appearance of software for each combination of a management program and an attribute value in the embodiment.
Figure 7:
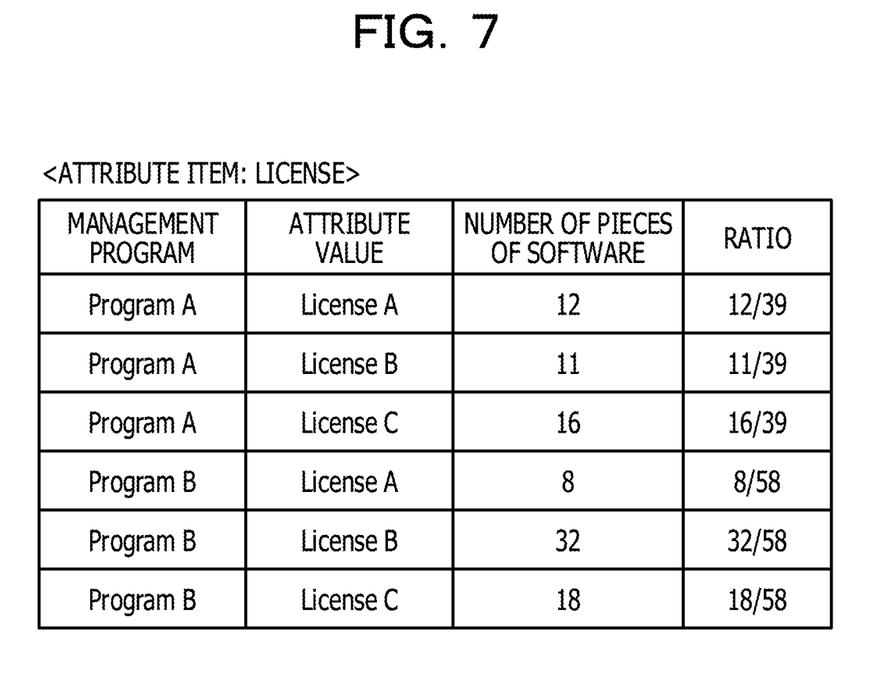
FIG. 7 is a chart illustrating an example of a result of calculation of a frequency of appearance of software for each combination of a management program and another attribute value in the embodiment.
Figure 8:
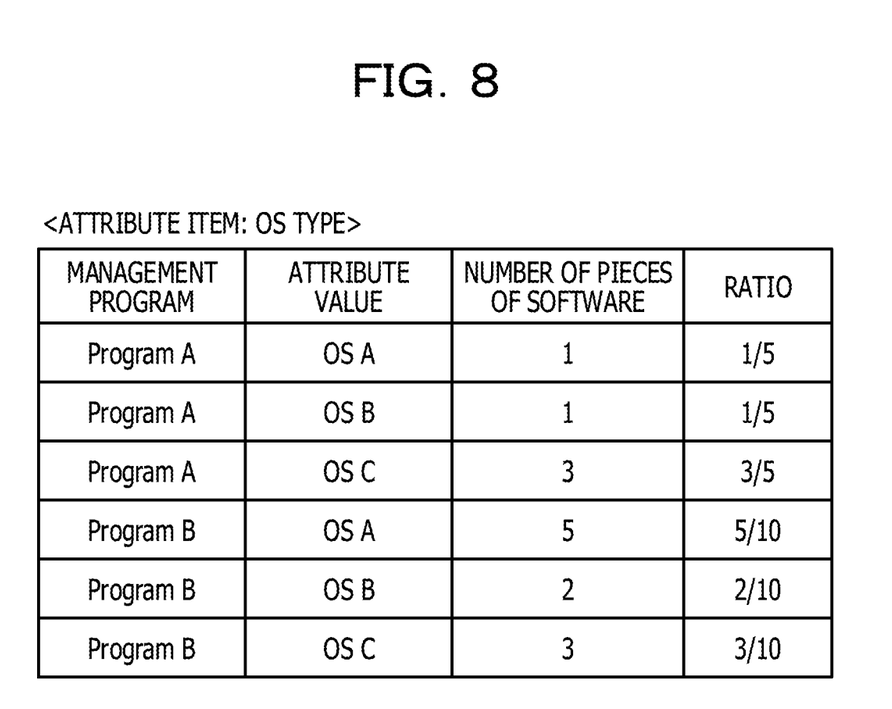
FIG. 8 is a chart illustrating an example of a result of calculation of a frequency of appearance of software for each combination of a management program and still another attribute value in the embodiment.

FIGS. 6 to 8 each illustrate an example of a result of calculation of a frequency of appearance of software by the CPU 101 for each of the attribute items in the embodiment. The CPU 101 stores the result of frequency of appearance of software calculated in OP 109 in the HDD 103. FIG. 6 illustrates an example of a result of calculation of a frequency of appearance of software for each combination of a management program and an attribute value when the attribute item is "VENDOR". The frequency of appearance is calculated, for instance, for each of the management programs.

In the example illustrated in FIG. 6, the CPU 101 calculates the number of appearances of software for each of combinations of a management program and a vendor based on the information stored in the "MANAGEMENT PROGRAM" column and the "VENDOR" column of the table illustrated in FIG. 4. For instance, the CPU 101 refers to the table illustrated in FIG. 4, and calculates the number of appearances of software having the combination of the management program "Program A" and the attribute value "Vendor A" of attribute item vendor. In the example illustrated in FIG. 4, each row of the table corresponds to a piece of software. Therefore, the CPU 101 calculates the number of appearances of software by regarding the number of appearances of software as the number of rows having the combination of the management program "Program A" and the vendor "Vendor A".

In the example illustrated in FIG. 6, for the combination of the management program "Program A" and the attribute value "Vendor A" of attribute item vendor, "NUMBER OF SOFTWARE", which is the number of appearances of software, is "39". For example, this indicates that there are 39 rows having the combination of the management program "Program A" and the vendor "Vendor A" in the table illustrated in FIG. 4. In this manner, the CPU 101 calculates the number of appearances of software including a combination of a management program and an attribute value, based on the information collected by the management programs. In the example illustrated in FIG. 6, the management program indicates "Program A" and "Program B", and the attribute values of vendor indicates "Vendor A", "Vendor B", and "Vendor C". However, the management program and the type of vendor are not limited to these.

FIG. 7 illustrates an example of the number of appearances of software, calculated for each of combinations of a management program and an attribute value of the attribute item "LICENSE". Similarly to the case of FIG. 6, in the example of FIG. 7, the CPU 101 refers to the table illustrated in FIG. 4, and calculates the number of appearances of software for each of combinations of a management program and an attribute value of the attribute item "LICENSE". FIG. 8 illustrates an example of the number of appearances of software, calculated for each of combinations of a management program and an attribute value of the attribute item "OS TYPE". Similarly to the case of FIGS. 6 and 7, in the example of FIG. 8, the CPU 101 refers to the table illustrated in FIG. 4, and calculates the number of appearances of software for each of combinations of a management program and an attribute value of the attribute item "OS TYPE". When the CPU 101 has completed calculation of the number of appearances of software for each of combinations of a management program and an attribute value, the CPU 101 proceeds the processing to OP 110.

In OP 110, the CPU 101 functions as a calculation unit, and for each of attribute values of every attribute item, calculates a ratio of the number of appearances of software for each of the management programs based on the number of appearances of software calculated in OP 109. The ratio of the number of appearances of software for each of the management programs is an example of the frequency of appearance of software. In OP 110, the CPU 101 calculates a frequency of appearance of each of multiple pieces of software in the information acquired for combinations of each of multiple programs and an attribute value.

The CPU 101 stores the calculated ratios in the "RATIO" column of the table illustrated in FIGS. 6 to 8. For instance, in the example illustrated in FIG. 6, the ratio of each number of appearances to the total number of appearances calculated based on the parent population of the number of appearances of software with "Program A" in the "MANAGEMENT PROGRAM" column. Thus, for the combinations of Program A as the management program and the Vendors A, B, C as the attribute values of attribute item vendor, the ratios calculated in OP 110 by the CPU 101 are "39/41", "1/41", and "1/41" as illustrated in the "RATIO" column of FIG. 6. In the example illustrated in FIG. 6, the CPU 101 similarly calculates the ratios ("5/17", "6/17", and "6/17", respectively) for the combinations of Program B as the management program and the Vendors A, B, C as the attribute values of attribute item vendor. As illustrated in FIGS. 7 and 8, the CPU 101 calculates the ratios for other attribute values.

When the CPU 101 calculates the ratio of the number of appearances of software for a combination of each management program and each attribute value of every attribute item, the CPU 101 proceeds the processing to OP 111.

Figure 9:
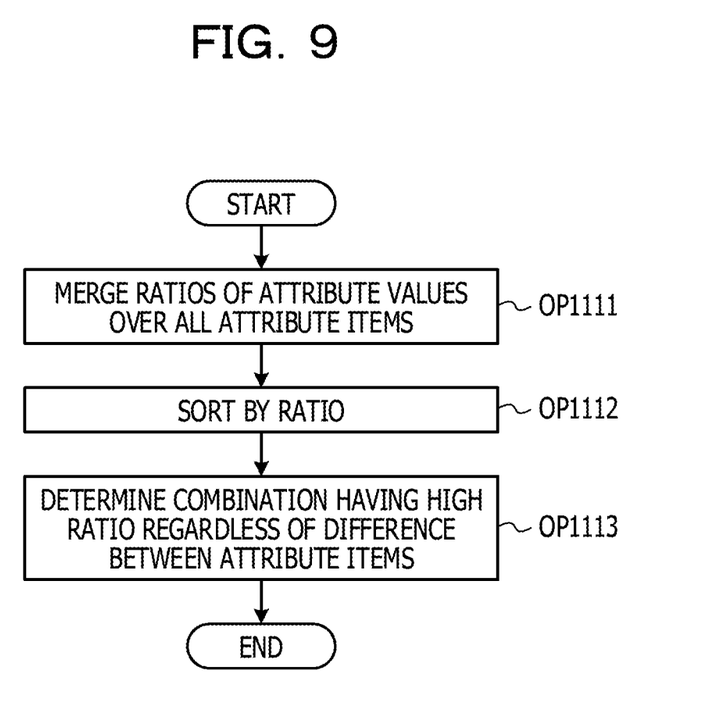
FIG. 9 is a flowchart illustrating an example of processing of a subroutine performed by the information processing device in the embodiment.

In OP 111, the CPU 101 functions as a determination unit, and determines a correspondence relationship between management program and software based on the ratios calculated in OP 110, the correspondence relationship indicating a management program for each software, in which the information collected by the management program is to be used. FIG. 9 illustrates an example of processing of a subroutine performed by the CPU 101 in OP 111.

In OP 1111, the CPU 101 merges the ratios calculated in OP 110 over the attribute values of all the attribute items. Subsequently, the CPU 101 proceeds the processing to OP 1112. In OP 1112, the CPU 101 sorts the combinations, by ratio, of a management program, an attribute value, and the ratio of the number of appearances of software merged in OP 1111. For example, the CPU 101 arranges the ratios of the number of appearances of software for the combinations over the entire attribute values in descending order regardless of the difference between attribute items. For the examples of result illustrated in FIGS. 6 to 8, FIG. 10 illustrates an example of result of arrangement of ratios of the number of appearances of software in descending order in OP 1112 by the CPU 101. Subsequently, the CPU 101 proceeds the processing to OP 1113.

In OP 1113, based on the frequency of appearance calculated regardless of the difference between attribute items, the CPU 101 determines a correspondence relationship between each of the uniquely identified multiple pieces of software, and one of multiple programs from which information on the software is acquired.

For example, the CPU 101 identifies a combination of a management program and an attribute value one by one in descending order of ratio of the number of appearances. The CPU 101 identifies the information on software having the identified combination from the information on software, illustrated in FIG. 4, collected by the management programs. The CPU 101 then determines a correspondence relationship between the management program and the software based on the information on the identified software.

Figure 10:
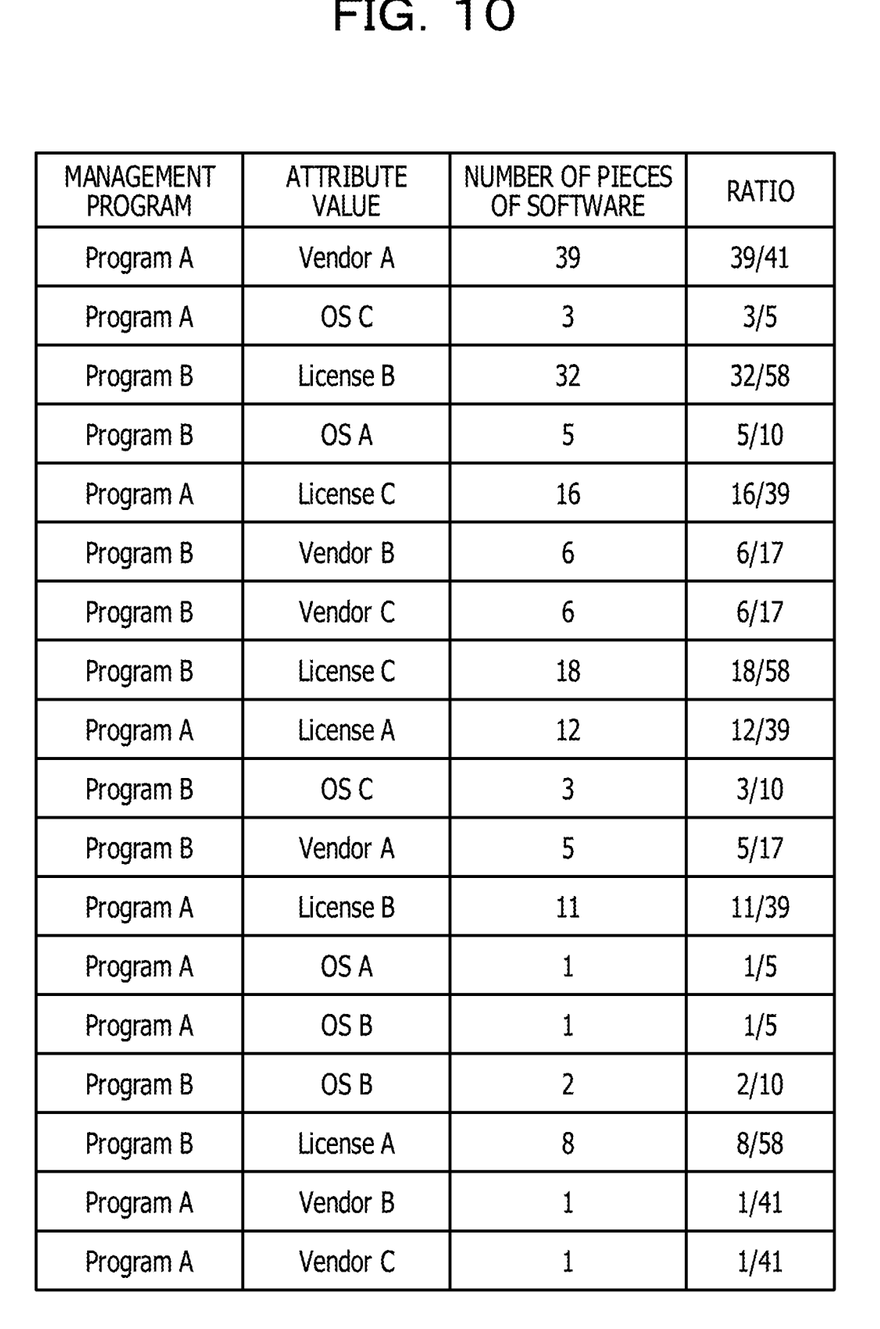
FIG. 10 is a chart illustrating an example of a ratio of the number of appearances of software calculated in the embodiment.

In the example illustrated in FIG. 10, the highest one of the ratios calculated in OP 110 is "39/41" which is the ratio calculated for the combination of Program A as the management program and Vendor A as the attribute value of attribute item vendor. In the table illustrated in FIG. 4, the CPU 101 then identifies the information (information in the row with "Program A" in the "MANAGEMENT PROGRAM" column and "V1.0" in the "VERSION" column in FIG. 4) on software including the combination of Program A as the management program and Vendor A as the attribute value of attribute item vendor. The CPU 101 then determines a correspondence relationship (Program A as the management program and Software A with version V1.0) between the management program and the software based on the information on the identified software.

The CPU 101 identifies the combination (the combination of Program A as the management program and the attribute value OS C of the attribute item OS type) with the second highest ratio "3/5" next to "39/41" mentioned above in the result illustrated in FIG. 10. Next, in the table illustrated in FIG. 4, the CPU 101 identifies the information (information in the row with "Program D" in the "SOFTWARE NAME" column and "V3.0" in the "VERSION" column in FIG. 4) on software including the combination of Program A as the management program and the attribute value OS C of the attribute item OS type. The CPU 101 then determines a correspondence relationship (Program A as the management program and Software D with version V3.0) between the management program and the software based on the information on the identified software.

As described above, the CPU 101 refers to the result illustrated in FIG. 10, and determines a correspondence relationship between the management program and the software by repeating the above-described processing in descending order of calculated ratio. When a correspondence relationship of software with the management program is already determined, even if a correspondence relationship between the same software and another management program is newly determined, the CPU 101 continues the processing without using the newly determined correspondence relationship. In this manner, determination of a correspondence relationship between management program and software allows the CPU 101 to determine a management program for each software using the correspondence relationship, in which the information collected by the management program is to be used as more accurate information.

Figure 11:
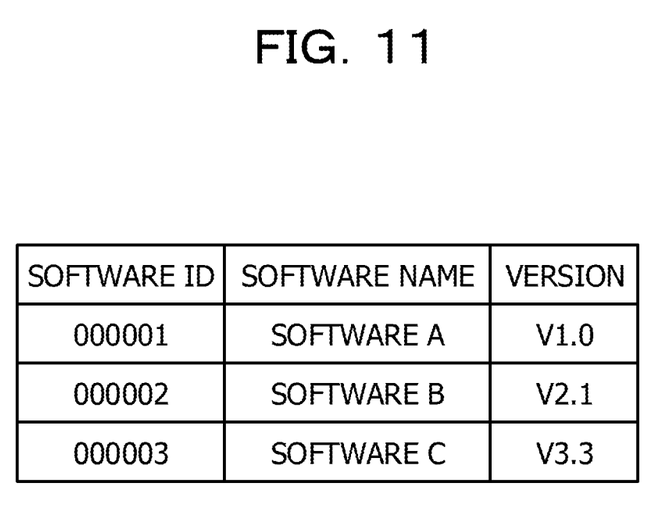
FIG. 11 is a chart illustrating an example of a table indicating information on software in the embodiment.

In OP 1113, the CPU 101 stores information on the software for which a correspondence relationship has been determined, specifically, information including a software name, a version, and a software ID in a table stored in the HDD 103. FIG. 11 illustrates an example of a table indicating information on software stored in the HDD 103. The table identifies the software in which a management program by which information is to be collected is determined. The CPU 101 determines a correspondence relationship between software and management program based on the calculated ratios, and stores in the table the information on the software for which a correspondence relationship has been determined. Then, the CPU 101 proceeds the processing to OP 112.

In OP 112, the CPU 101 determines whether or not information indicating a server in which relevant software is installed has been registered in the CMDB, the relevant software having a correspondence relationship with a management program, the correspondence relationship been determined by the above-mentioned processing. When the information on the software has been registered in the CMDB (Yes in OP 112), the CPU 101 performs processing on information on which the processing in OP 102 to OP 113 has not been performed, the information being part of the information acquired in OP 101. On the other hand, when the information on the software has not been registered to the CMDB (No in OP 112), the CPU 101 proceeds the processing to OP 113.

Figure 12:
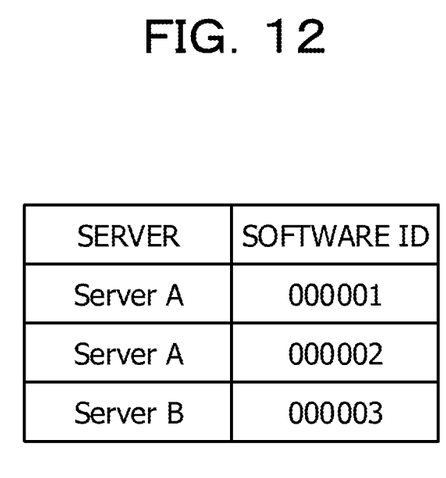
FIG. 12 is a chart illustrating an example of a table indicating information on software which has been installed in a server in the embodiment.

In OP 113, the CPU 101 registers information indicating a server in which relevant software is installed into the CMDB in OP 112 using the information on the software acquired in OP 101, the information being determined to be unregistered in the CMDB. FIG. 12 illustrates an example of a table indicating a relationship between registered server in the CMDB and installed software. In the embodiment, the table allows the information processing device 10 to recognize the software installed in each server. The table allows the information processing device 10 to recognize a management program by which the information on each software is to be acquired. Consequently, even when the information on the same software is acquired from multiple management programs, it is possible for the information processing device 10 to identify more accurate information.

As described above, according to the embodiment, a frequency of appearance of software in information collected by the management programs is calculated for each of the attribute values. Consequently, for each software, it is possible to determine a management program by which more accurate information is collected. When multiple management programs acquire information on the same software, it is possible to determine a management program that collects information which more accurately indicates the information on the software. Therefore, it is possible for the information processing device 10 to identify more accurate information on the software installed in each server without redundant operation.

Although the embodiment has been described above, the configuration and the processing of the information processing device 10 are not limited to those of the embodiment, and various modifications may be made within a range that does not lose the technical idea and the identity of the embodiment. For instance, in the embodiment, the servers 40, 50 may be a physical server or a virtual server. In the description above, in OP 1111, the CPU 101 merges the ratios calculated in OP 110 over the attribute values of all the attribute items. However, the CPU 101 may not merge the ratios calculated in OP 110 in this manner, and may compare the ratio calculated for each of the attribute values of the attribute items side by side, and may identify a combination having a high ratio.

<Computer-Readable Recording Medium>

A program to cause a computer and other machines, devices (hereinafter, computer or the like) to implement a management tool for setting a data transmitter receiver, an OS, and others may be recorded on a computer-readable recording medium. The function may be provided by causing a computer to read and execute the program in the recording medium. The computer is, for instance, an information processing device, or a server.

The computer-readable recording medium refers to a recording medium that is capable of storing information such as data and programs electrically, magnetically, optically, mechanically, or by chemical functioning and of reading the information from a computer or the like. Media detachable from a computer among such recording media include, for instance, a flexible disk, a magneto-optical disc, a CD-ROM, a CD-R/W, a DVD, a Blu-ray Disc, a DAT, 8-mm tape, and a memory card such as a flash memory. Recording media fixed to a computer include a hard disk, and a ROM.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An information processing device comprising:
a memory; and
a processor coupled to the memory and configured to:
acquire, from each of a plurality of devices, information including storage destinations for modules of a plurality of software installed in a device and attribute values for attribute items of the plurality of software, the information being collected by each of the plurality of devices by executing at least one of a plurality of programs;
uniquely identify the plurality of software indicated by the acquired information based on the storage destinations for the modules of the plurality of software indicated by the acquired information;
calculate, for each of a plurality of combinations obtained by the plurality of programs and the plurality of attribute values, an appearance frequency of the plurality of software; and
determine, for each of the plurality of software, a program to be used for collecting the information from among the plurality of programs, based on the calculated appearance frequency.

2. The information processing device according to claim 1, wherein the processor is configured to:
identify the plurality of combinations of the plurality of programs and the attribute values in descending order of the calculated appearance frequency regardless of a difference between the attribute items, and
determine a correspondence relationship between the plurality of software included in information having the plurality of identified combinations among the acquired information, and the plurality of programs included in the plurality of identified combinations.

3. The information processing device according to claim 2, wherein the processor is configured to in the case where a correspondence relationship of the plurality of software with one of the plurality of programs is determined in advance, even when a correspondence relationship between the plurality of software and another one of the plurality of programs is newly determined, subsequent identification processing is performed without using the newly determined correspondence relationship.

4. The information processing device according to claim 1, wherein the processor is configured to calculate the appearance frequency for each of the plurality of programs.

5. An information processing method executed by a processor of an information processing device, the information processing method comprising:
acquiring, from each of a plurality of devices, information including storage destinations for modules of a plurality of software installed in a device and attribute values for attribute items of the plurality of software, the information being collected by each of the plurality of devices by executing at least one of a plurality of programs;
uniquely identifying the plurality of software indicated by the acquired information based on the storage destinations for the modules of the plurality of software indicated by the acquired information;
calculating, for each of a plurality of combinations obtained by the plurality of programs and the plurality of attribute values, an appearance frequency of the plurality of software; and
determining, for each of the plurality of software, a program to be used for collecting the information from among the plurality of programs, based on the calculated appearance frequency.

6. The information processing method according to claim 5, further comprising
identifying the plurality of combinations of the plurality of programs and the attribute values in descending order of the calculated appearance frequency regardless of a difference between the attribute items, wherein the determining includes determining a correspondence relationship between the plurality of software included in information having the plurality of identified combinations among the acquired information, and the plurality of programs included in the plurality of identified combinations.

7. The information processing method according to claim 5, further comprising in the case where a correspondence relationship of the plurality of software with one of the plurality of programs is determined in advance, even when a correspondence relationship between the plurality of software and another one of the plurality of programs is newly determined, subsequent identification processing is performed without using the newly determined correspondence relationship.

8. The information processing method according to claim 5, wherein the calculating includes calculating the appearance frequency for each of the plurality of programs.

9. A non-transitory computer-readable storage medium storing a program that causes a computer to execute a process, the process comprising:
acquiring, from each of a plurality of devices, information including storage destinations for modules of a plurality of software installed in a device and attribute values for attribute items of the plurality of software, the information being collected by each of the plurality of devices by executing at least one of a plurality of programs;
uniquely identifying the plurality of software indicated by the acquired information based on the storage destinations for the modules of the plurality of software indicated by the acquired information;
calculating, for each of a plurality of combinations obtained by the plurality of programs and the plurality of attribute values, an appearance frequency of the plurality of software; and
determining, for each of the plurality of software, a program to be used for collecting the information from among the plurality of programs, based on the calculated appearance frequency of appearance.

10. The storage medium according to claim 9, further comprising
identifying the plurality of combinations of the plurality of programs and the attribute values in descending order of the calculated appearance frequency regardless of a difference between the attribute items,
wherein the determining includes determining a correspondence relationship between the plurality of software included in information having the plurality of identified combinations among the acquired information, and the plurality of programs included in the plurality of identified combinations.

11. The storage medium according to claim 9, further comprising in the case where a correspondence relationship of the plurality of software with one of the plurality of programs is determined in advance, even when a correspondence relationship between the plurality of software and another one of the plurality of programs is newly determined, subsequent identification processing is performed without using the newly determined correspondence relationship.

12. The storage medium according to claim 9, wherein the calculating includes calculating the appearance frequency for each of the plurality of programs.

13. The storage medium according to claim 9, wherein the determining includes:
calculating, for each of the plurality of combinations, a ratio of the appearance frequency for a combination to a total number of the calculated appearance frequencies corresponding to a program included in the combination; and
determining the program to be used for collecting the information based on the calculated ratio.

* * * * *